(12) United States Patent
An et al.

(10) Patent No.: US 9,131,228 B2
(45) Date of Patent: Sep. 8, 2015

(54) AUTOSTEREOSCOPIC DISPLAY AND CONTROL METHOD THEREOF

(71) Applicant: LG DISPLAY CO., LTD., Seoul (KR)

(72) Inventors: Cheunghwan An, Seoul (KR); Hoonki Kim, Gyeonggi-do (KR); Bogyun Chung, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 363 days.

(21) Appl. No.: 13/726,789

(22) Filed: Dec. 26, 2012

(65) Prior Publication Data

US 2014/0078194 A1 Mar. 20, 2014

(30) Foreign Application Priority Data

Sep. 19, 2012 (KR) .................. 10-2012-0103788
Oct. 16, 2012 (KR) .................. 10-2012-0114880

(51) Int. Cl.
*H04N 13/04* (2006.01)
*H04N 13/02* (2006.01)
(Continued)

(52) U.S. Cl.
CPC ........... *H04N 13/0402* (2013.01); *G09G 3/003* (2013.01);
(Continued)

(58) Field of Classification Search
CPC .............. H04N 13/00; H04N 2213/00; H04N 2213/002; H04N 13/0402–13/042; G09G 3/003; G09G 3/2025; G09G 3/342; G09G 3/36; G09G 3/3611; G09G 5/10; G09G 2310/024; G09G 2340/0435
See application file for complete search history.

(56) References Cited

U.S. PATENT DOCUMENTS

2011/0242442 A1 10/2011 Lee et al.
2012/0147062 A1 6/2012 Seo et al.
(Continued)

FOREIGN PATENT DOCUMENTS

CN 102566192 A 7/2012
CN 102568410 A 7/2012
(Continued)

OTHER PUBLICATIONS

German Office Action dated May 3, 2013 for corresponding German Application No. 10 2012 024 521.1.
(Continued)

*Primary Examiner* — Seokyun Moon
*Assistant Examiner* — David Tung
(74) *Attorney, Agent, or Firm* — Morgan, Lewis & Bockius LLP

(57) ABSTRACT

An autostereoscopic display and a control method thereof are disclosed. The autostereoscopic display includes a display panel displaying 3D image data, a backlight unit providing light to the display panel, a backlight driver which sequentially drives light sources of the backlight unit along a scanning direction of the 3D image data written to the display panel, a switchable 3D element which forms a barrier or a lens for separating optical axes of left eye image data and right eye image data from the 3D image data, and a 3D element driver which electrically controls the switchable 3D element and shifts the barrier or the lens formed in the switchable 3D element.

18 Claims, 15 Drawing Sheets

(51) Int. Cl.
*G09G 3/00* (2006.01)
*G09G 3/20* (2006.01)
*G09G 3/34* (2006.01)
*G09G 3/36* (2006.01)
*G09G 5/10* (2006.01)

(52) U.S. Cl.
CPC ............. *G09G 3/2025* (2013.01); *G09G 3/342* (2013.01); *G09G 3/3611* (2013.01); *G09G 5/10* (2013.01); *H04N 13/0404* (2013.01); *H04N 13/0409* (2013.01); *H04N 13/0497* (2013.01); *G09G 3/36* (2013.01); *G09G 2310/024* (2013.01); *G09G 2340/0435* (2013.01); *H04N13/026* (2013.01); *H04N 13/0422* (2013.01); *H04N 13/0452* (2013.01)

(56) References Cited

U.S. PATENT DOCUMENTS

2012/0154556 A1  6/2012  An et al.
2012/0287359 A1* 11/2012  Yamazaki et al. .............. 349/15

FOREIGN PATENT DOCUMENTS

EP         2 403 256 A2     1/2012
JP         EP2403256    *   1/2012  ............. H04N 13/00

OTHER PUBLICATIONS

Office Action dated Feb. 2, 2015, for Chinese patent application No. 201210574243.7.

* cited by examiner

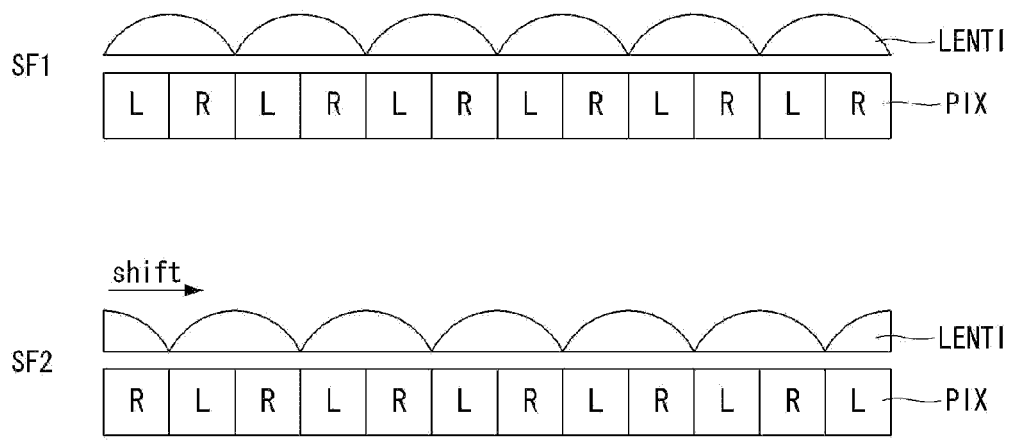

FIG. 16

| | 3Block | | | | | 6Block | | | | |
|---|---|---|---|---|---|---|---|---|---|---|
| BLU Scanning Duty (%) | 50 | 60 | 70 | 75 | 80 | 50 | 60 | 70 | 75 | 80 |
| MPRT(ms) | 5.4 | 5.9 | 6.4 | 6.6 | 6.9 | 5.6 | 6.1 | 6.7 | 6.9 | 7.1 |
| 3D Luminance (nit) | 52.50 | 63.00 | 73.50 | 78.75 | 84.00 | 52.50 | 63.00 | 73.50 | 78.75 | 84.00 |

AUTOSTEREOSCOPIC DISPLAY AND CONTROL METHOD THEREOF

This application claims the benefit of Korean Patent Application No. 10-2012-0103788 filed on Sep. 19, 2012, and Korean Patent Application No. 10-2012-0114880 filed on Oct. 16, 2012, the entire contents of which is incorporated herein by reference for all purposes as if fully set forth herein.

BACKGROUND OF THE INVENTION

1. Field of the Invention

Embodiments of the invention relate to an autostereoscopic display and a control method thereof.

2. Discussion of the Related Art

As the stereoscopic image reproduction technology is applied to display devices, such as a television and a monitor, now is the age in which people can view 3D stereoscopic images even at home. A 3D display may be classified into a stereoscopic display and an autostereoscopic display called a glasses-free 3D display. The stereoscopic display displays a parallax image between the left and right eyes on a direct-view display or a projector through changes in a polarization direction of the parallax image or in a time-division manner and thus implements a stereoscopic image using polarization glasses or liquid crystal shutter glasses. The autostereoscopic display implements the stereoscopic image by generally installing an optical element, such as a parallax barrier and a lenticular lens, for separating an optical axis of the parallax image in front of a display screen.

The 3D display may be manufactured based on an active matrix liquid crystal display. The active matrix liquid crystal display comprises a thin film transistor (TFT) as a switching element of pixel. Liquid crystal cells of the active matrix liquid crystal display change a transmittance based on a difference between a data voltage supplied to a pixel electrode and a common voltage supplied to a common electrode, thereby displaying an image.

Because the liquid crystal display is not a self-emission element, a separate light source such as a backlight unit is necessary. The liquid crystal display may cause a reduction in image quality, for example, motion blur because of slow response characteristics of liquid crystals. To prevent the reduction in image quality resulting from the slow response characteristics of the liquid crystals, the backlight unit may be driven based on a blinking driving technology or a scanning backlight driving technology. In the blinking driving technology, light sources of the backlight unit are simultaneously turned on and off.

In the scanning backlight driving technology, a light emitting area of the backlight unit is divided into a plurality of backlight blocks, and the backlight blocks each including the light sources are sequentially turned on along a data scanning direction of the liquid crystal display panel.

A technology has been recently proposed to implement the autostereoscopic display using a switchable 3D element, such as a switchable lens and a switchable barrier, in which a barrier or a lens is not fixed and is electrically controllable. The switchable 3D element includes a liquid crystal layer and electrodes applying an electric signal to the liquid crystal layer and thus may electrically control liquid crystal molecules. The switchable 3D element was disclosed in U.S. Patent Application Nos. 2011/0242442 and 2012/0154556 filed by the present applicant.

The blinking driving technology simultaneously turns on and off the light sources of the backlight unit, which provide light to the entire screen of the liquid crystal display panel, based on response characteristic of liquid crystals positioned in the center of the liquid crystal display panel. When the blinking driving technology is applied to the autostereoscopic display including the switchable 3D element, 3D crosstalk is generated at upper and lower sides of the liquid crystal display panel because of a difference between liquid crystal response times of the liquid crystal display panel and the switchable 3D element on the upper and lower sides of the liquid crystal display panel and a difference between addressing timing of left and right eye image data and the liquid crystal response time. The 3D crosstalk is a phenomenon in which the 3D image appears as overlaid images of an image (hereinafter referred to as 'left eye recognition image') perceived through the viewer's left eye and an image (hereinafter referred to as 'right eye recognition image') perceived through the viewer's right eye.

The scanning backlight driving technology sequentially drives the light sources of the backlight unit by preset backlight block unit. The scanning backlight driving technology may be applied to the autostereoscopic display including the switchable 3D element. The pixel data is sequentially addressed to pixels of the liquid crystal display panel in a direction from the upper side to the lower side of the liquid crystal display panel. Hence, the liquid crystals of the liquid crystal display panel sequentially respond in the direction from the upper side to the lower side of the liquid crystal display panel. The backlight blocks of the backlight unit are sequentially turned on and off in synchronization with the response of the liquid crystal display panel. As a result, a motion picture response time (MPRT) and the 3D crosstalk may be improved. However, even when the scanning backlight driving technology is applied to the autostereoscopic display including the switchable 3D element, the switchable 3D element is simultaneously turned on and off on the entire screen of the liquid crystal display panel. Hence, a luminance difference depending on a position of the screen and the 3D crosstalk are is generated because of a difference between liquid crystal response times of the liquid crystal display panel and the switchable 3D element and a difference between the liquid crystal response times of the liquid crystal display panel and the switchable 3D element and turn-on and turn-off times of the backlight unit.

SUMMARY OF THE INVENTION

Embodiments of the invention provide an autostereoscopic display including a switchable 3D element and a control method thereof capable of increasing the quality of a 3D image.

In one aspect, there is an autostereoscopic display comprising a display panel configured to display 3D image data, a backlight unit configured to provide light to the display panel, a backlight driver configured to sequentially drive light sources of the backlight unit along a scanning direction of the 3D image data written to the display panel, a switchable 3D element configured to form a barrier or a lens for separating optical axes of left eye image data and right eye image data from the 3D image data, and a 3D element driver configured to electrically control the switchable 3D element and shift the barrier or the lens formed in the switchable 3D element.

A light emitting area of the backlight unit is divided into a plurality of backlight blocks, and the backlight blocks are sequentially turned on and off along the data scanning direction of the display panel.

The switchable 3D element is divided into a plurality of 3D blocks respectively corresponding to the plurality of backlight blocks of the backlight unit. A barrier or a lens of each of the 3D blocks is shifted on a per 3D block basis.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 5 to 8 illustrate an example of a method for driving an autostereoscopic display without a loss of a resolution;

FIG. 9 illustrates an example of dividing a light emitting area of a backlight unit into six backlight blocks;

FIG. 16 illustrates a motion picture response time (MPRT) and a luminance of a 3D image based on a duty ratio of a backlight unit;

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

An autostereoscopic display according to an example embodiment of the invention is manufactured based on a liquid crystal display (LCD) including a backlight unit driven in a scanning backlight driving technology. The autostereoscopic display includes a switchable 3D element, which is electrically controlled and is shifted, and separates optical axes of left and right eye images using the switchable 3D element. The switchable 3D element may be implemented as one of a switchable lens and a switchable barrier. The switchable 3D element may be positioned in the front or in the rear of a display panel. Alternatively, the switchable 3D element may be embedded in the display panel.

Figure 1:
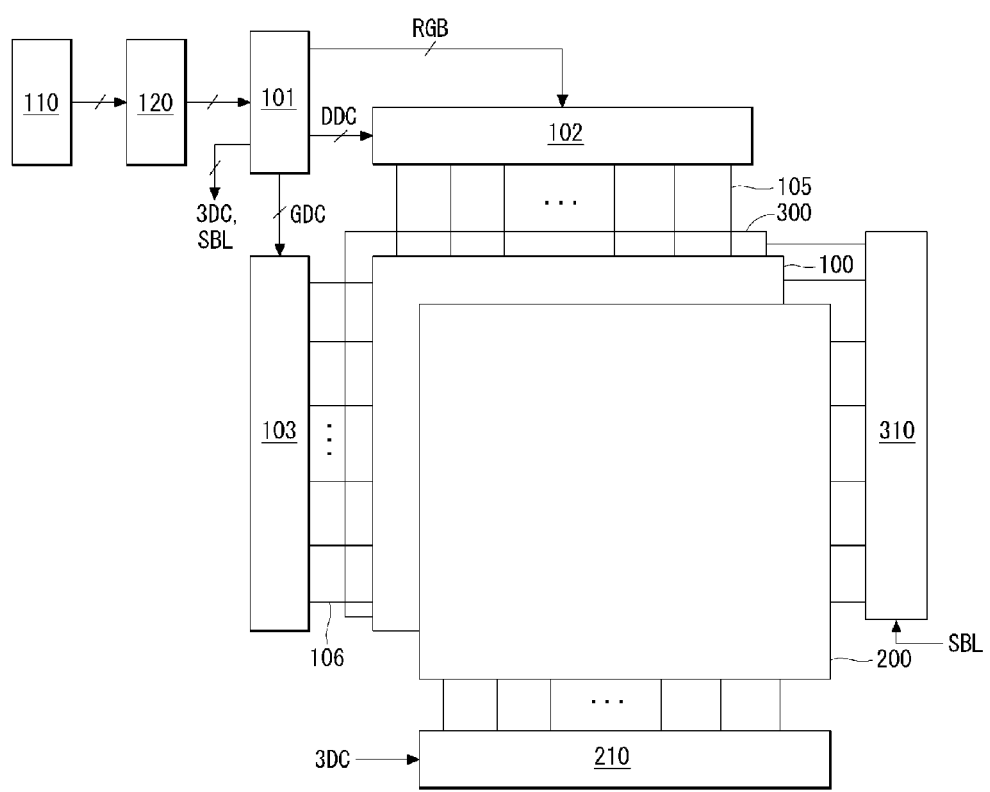
FIG. 1 is a block diagram of an autostereoscopic display according to an example embodiment of the invention.
Figure 2:
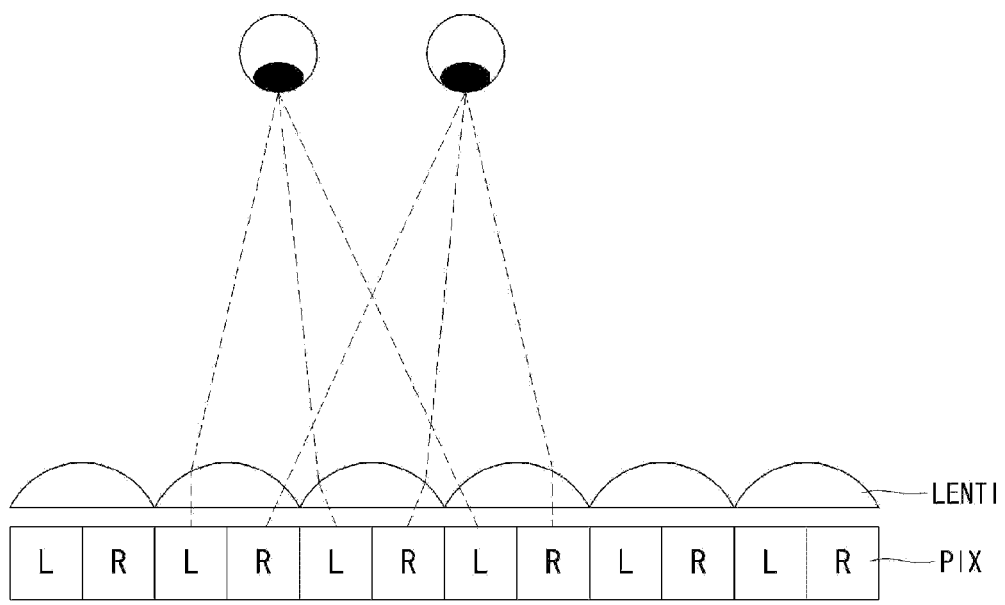
FIG. 2 is a cross-sectional view of a switchable lens.
Figure 3:
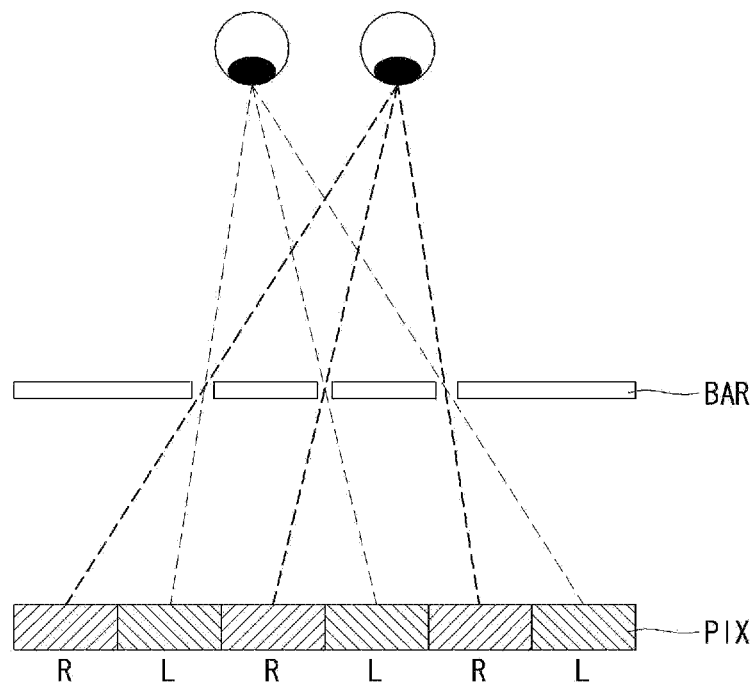
FIG. 3 is a cross-sectional view of a switchable barrier.

As shown in FIGS. 1 to 3, the autostereoscopic display according to the embodiment of the invention includes a display panel 100, a display panel driver, a backlight unit 300 positioned below a back surface of the display panel 100, a backlight driver 310, a switchable 3D element 200, a 3D element driver 210, a timing controller 101, etc.

The display panel 100 includes a pixel array PIX including data lines 105, gate lines (or scan lines) 106 orthogonal to the data lines 105, and pixels arranged in a matrix form. Each of the pixels may include subpixels of different colors. The pixel array PIX displays a 2D image in a 2D mode and displays a left eye image and a right eye image in a 3D mode.

The display panel driver includes a data driving circuit 102 for supplying data voltages of the 2D and 3D images to the data lines 105 of the display panel 100 and a gate driving circuit 103 for sequentially supplying a gate pulse (or scan pulse) to the gate lines 106 of the display panel 100. The display panel driver spatially distributes and writes left eye image data and right eye image data to the pixels of the display panel 100 in the 3D mode.

The data driving circuit 102 converts digital video data RGB received from the timing controller 101 into analog gamma voltages and generates the data voltages. The data driving circuit 102 then supplies the data voltages to the data lines 105 of the display panel 100. The gate driving circuit 103 supplies the gate pulse synchronized with the data voltage supplied to the data lines 105 to the gate lines 106 under the control of the timing controller 101 and sequentially shifts the gate pulse.

The backlight unit 300 may be implemented as one of an edge type backlight unit and a direct type backlight unit. Light sources of the backlight unit 300 may be implemented as point light sources such as a light emitting diode (LED). A light emitting area of the backlight unit 300 may be divided into a plurality of backlight blocks, so that the backlight unit 300 is driven suitably for the scanning backlight driving technology.

The backlight driver 310 sequentially drives the light sources of the backlight unit 300 along a scanning direction of data written to the display panel 100 under the control of the timing controller 101. Thus, the backlight driver 310 turns on or off the light sources of the backlight unit 300, so that it drives the light sources of the backlight unit 300 based on the scanning backlight driving technology and sequentially turns on the backlight blocks of the backlight unit 300 on a per block basis.

The switchable 3D element 200 is implemented as a switchable lens LENTI shown in FIG. 2 or a switchable barrier BAR shown in FIG. 3. The switchable 3D element 200 may be attached on the display panel 100 or embedded in the display panel 100. The switchable 3D element 200 is electrically controlled to form one of a barrier and a lens. The barrier or the lens separates optical axes of left eye image data and right eye image data from 3D image data. Cells of the switchable 3D element 200 includes a birefringent medium such as liquid crystal, an electrode, etc. The switchable 3D element 200 is divided into a plurality of 3D blocks which have the same form and the same number as the backlight blocks of the backlight unit 300 divided based on the scanning backlight driving technology. The 3D blocks of the switchable 3D element 200 correspond to the backlight blocks of the backlight unit 300, respectively. Cells of the 3D blocks shift a position of a barrier of the switchable barrier BAR or a position of the lens of the switchable lens LENTI based on a driving voltage applied through active switch elements, which will be described later. Thus, the barriers or the lenses formed in the 3D blocks are shifted along the data scanning direction of the display panel. Furthermore, the barriers or the lenses formed in the 3D blocks are shifted along a shift direction of the backlight blocks which are sequentially turned on and off. Further, the barriers or the lenses formed in the 3D blocks are shifted in synchronization with turn-off periods of the backlight blocks.

When the backlight blocks are sequentially turned on and off because of the shift of the backlight blocks, which are driven and turned on under the control of the timing controller 101 in the 3D mode, the 3D element driver 210 sequentially shifts the barrier or the lens formed in the switchable 3D element 200 on a per 3D block basis in synchronization with a turn-off period of each of the backlight blocks.

The timing controller 101 supplies the digital video data RGB of the 2D and 3D input images received from a host system 110 to the data driving circuit 102. The timing controller 101 receives timing signals, such as a vertical sync signal, a horizontal sync signal, a data enable, and a main clock, from the host system 110 in synchronization with the digital video data RGB of the 2D and 3D input images. The timing controller 101 controls an operation timing of each of the display panel drivers 102 and 103, the backlight driver 310, and the 3D element driver 210 using the timing signals and generates timing control signals for synchronizing the operation timings of the drivers 102, 103, 310, and 210. The timing control signals include a source timing control signal DDC for controlling the operation timing of the data driving circuit 102, a gate timing control signal GDC for controlling the operation timing of the gate driving circuit 103, a scanning backlight control signal SBL, and a switchable 3D element control signal 3DC.

The timing controller 101 multiplies a frame rate of an input image by 'N' to obtain a frequency of (frame rate×N) Hz, where N is a positive integer equal to or greater than 2. Hence, the timing controller 101 may control an operation frequency of each of the display panel drivers 102 and 103 and the 3D element driver 210 based on the frequency of (frame rate×N) Hz. The frame rate of the input image is 50 Hz in a phase alternate line (PAL) scheme and 60 Hz in a national television standards committee (NTSC) scheme.

A 3D data formatter 120 may be installed between the host system 110 and the timing controller 101. In the 3D mode, the 3D data formatter 120 spatially distributes and rearranges the left eye image data and the right eye image data of the 3D image received from the host system 110 in conformity with a 3D data format of the autostereoscopic display. If 2D image data is input in the 3D mode, the 3D data formatter 120 may perform a previously determined 2D-to-3D image conversion algorithm, thereby producing left eye image data and right eye image data from the 2D image data. The 3D data formatter 120 may spatially distribute and rearrange the left eye image data and the right eye image data in conformity with the 3D data format of the autostereoscopic display.

The 3D data formatter 120 may produce copied image data of original image data received from the host system 110. The 3D data formatter 120 may compare and analyze the original image data to generate a motion vector using MEMC (Motion Estimation Motion Compensation) algorithm. Further, the 3D data formatter 120 may produce new image data inserted between the original image data based on the motion vector.

The host system 110 may be implemented as one of a TV system, a set-top box, a navigation system, a DVD player, a Blu-ray player, a personal computer (PC), a home theater system, and a phone system. The host system 110 converts the digital video data of the 2D and 3D input images into a format suitable for a resolution of the display panel 100 using a scaler and transmits the converted digital video data and the timing signals to the timing controller 101.

The host system 110 supplies the 2D image to the timing controller 101 in the 2D mode, and supplies the 3D image or the 2D image data to the 3D data formatter 120 in the 3D mode. The host system 110 transmits a mode signal to the timing controller 101 in response to user data received through a user interface (not shown) and thus may switch between a 2D mode operation and a 3D mode operation. The user interface may be implemented as a keypad, a keyboard, a mouse, an on-screen display (OSD), a remote controller, a graphic user interface (GUI), a touch user interface (UI), a voice recognition UI, or 3D UI, etc. The user may select the 2D mode and the 3D mode through the user interface and also may select the 2D-to-3D image conversion through the user interface in the 3D mode.

Figure 4:
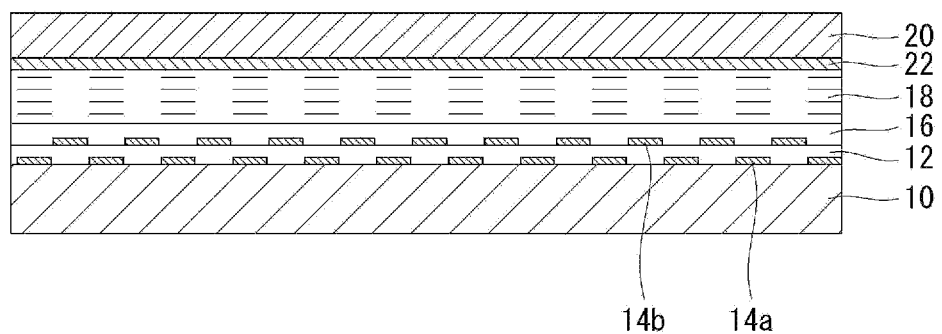
FIG. 4 is a cross-sectional view showing a structure of a switchable 3D element.

FIG. 4 is a cross-sectional view showing a structure of the switchable 3D element 200.

As shown in FIG. 4, the switchable 3D element 200 includes a liquid crystal layer 18 formed between a lower substrate 10 and an upper substrate 20, divided lower electrodes 14a and 14b, an upper electrode 22 formed on the upper substrate 20, etc.

Each of the lower substrate 10 and the upper substrate 20 is manufactured using a transparent material. In case of the switchable barrier BAR, a polarizing plate may be attached to each of the lower substrate 10 and the upper substrate 20. The electrodes 14a, 14b, and 22 are formed of a transparent electrode material, for example, indium tin oxide (ITO). The lower electrodes 14a and 14b may be separated into upper and lower layers by transparent insulating layers 12 and 16, so as to reduce a distance between electrode patterns and minutely control liquid crystal molecules of the liquid crystal layer 18.

The driving voltages may be independently applied to the lower electrodes 14a and 14b based on a driving method of the switchable lens LENTI or the switchable barrier BAR and may be differently changed. As shown in FIGS. 5 to 8, the driving voltages applied to the lower electrodes 14a and 14b may be shifted so as to shift the switchable lens LENTI or the switchable barrier BAR. The upper electrode 22 is formed on the entire surface of the upper substrate 20 as one layer, and one common voltage is applied to the upper electrode 22.

The embodiment of the invention is described using the switchable barrier as an example of the switchable 3D element 200. The switchable 3D element 200 according to the embodiment of the invention is not limited to the switchable barrier. For example, the switchable lens may be implemented by removing the polarizing plate from each of the upper substrate and the lower substrate of the switchable barrier and adjusting the driving voltage applied to the lower electrodes 14a and 14b so that the liquid crystal molecules are arranged in the lens form.

Figure 5:
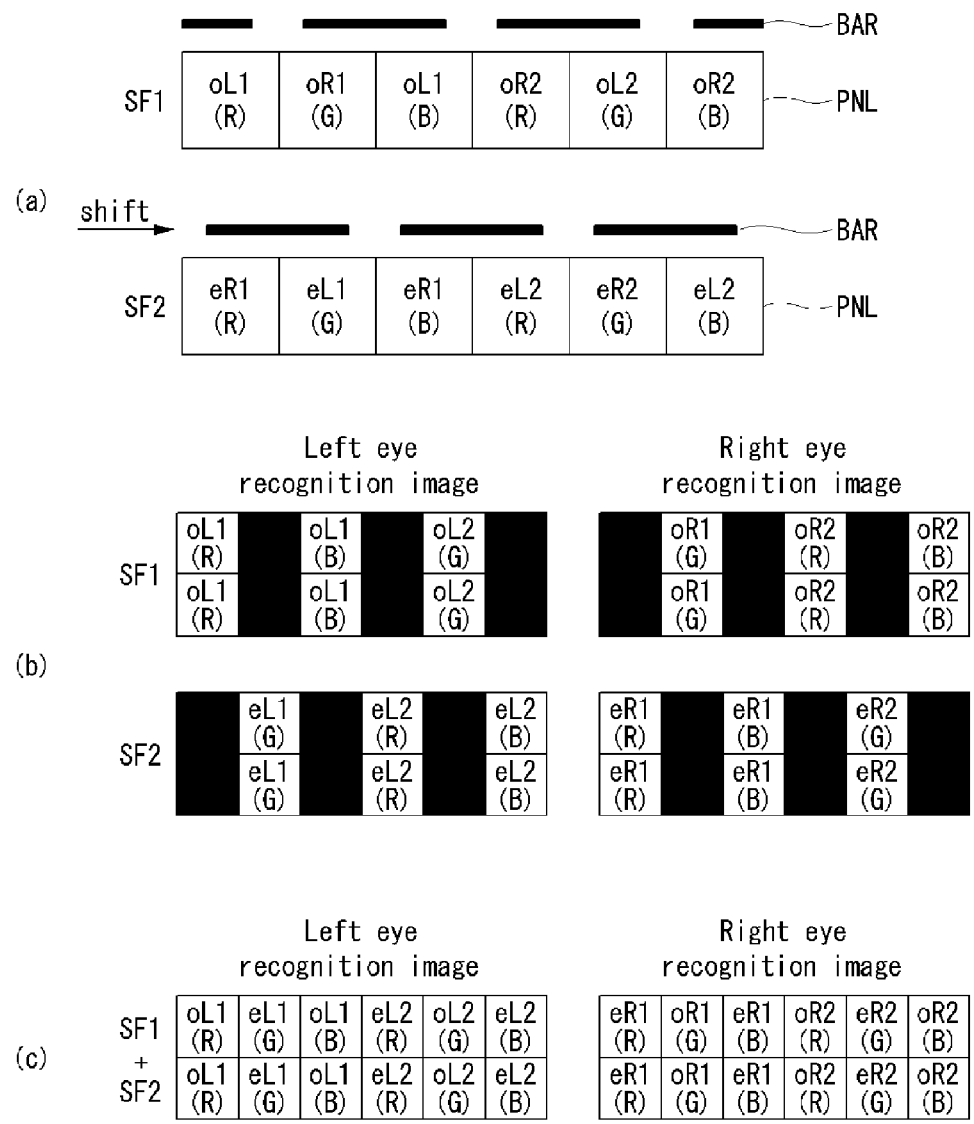

There is no loss of a resolution of each of the left eye image and the right eye image in a method for driving the autostereoscopic display shown in FIGS. 5 to 8. The driving method shown in FIGS. 5 to 8 divides one frame period into first and second sub-frame periods SF1 and SF2. As shown in (a) of FIG. 5, the driving method electrically controls the switchable 3D element 200, thereby shifting the switchable 3D element 200 by a predetermined distance in each frame period (or each sub-frame period) and shifting pixel data written to the pixel array PIX. (b) of FIG. 5 illustrates a left eye recognition image and a right eye recognition image separated by the switchable 3D element 200.

(c) of FIG. 5 illustrates the left eye recognition images and the right eye recognition images accumulated in one frame period. As can be seen from (c) of FIG. 5, the autostereoscopic display may be implemented without a reduction in the resolution of the image by properly shifting the switchable 3D element 200 and the pixel data.

Figure 6:
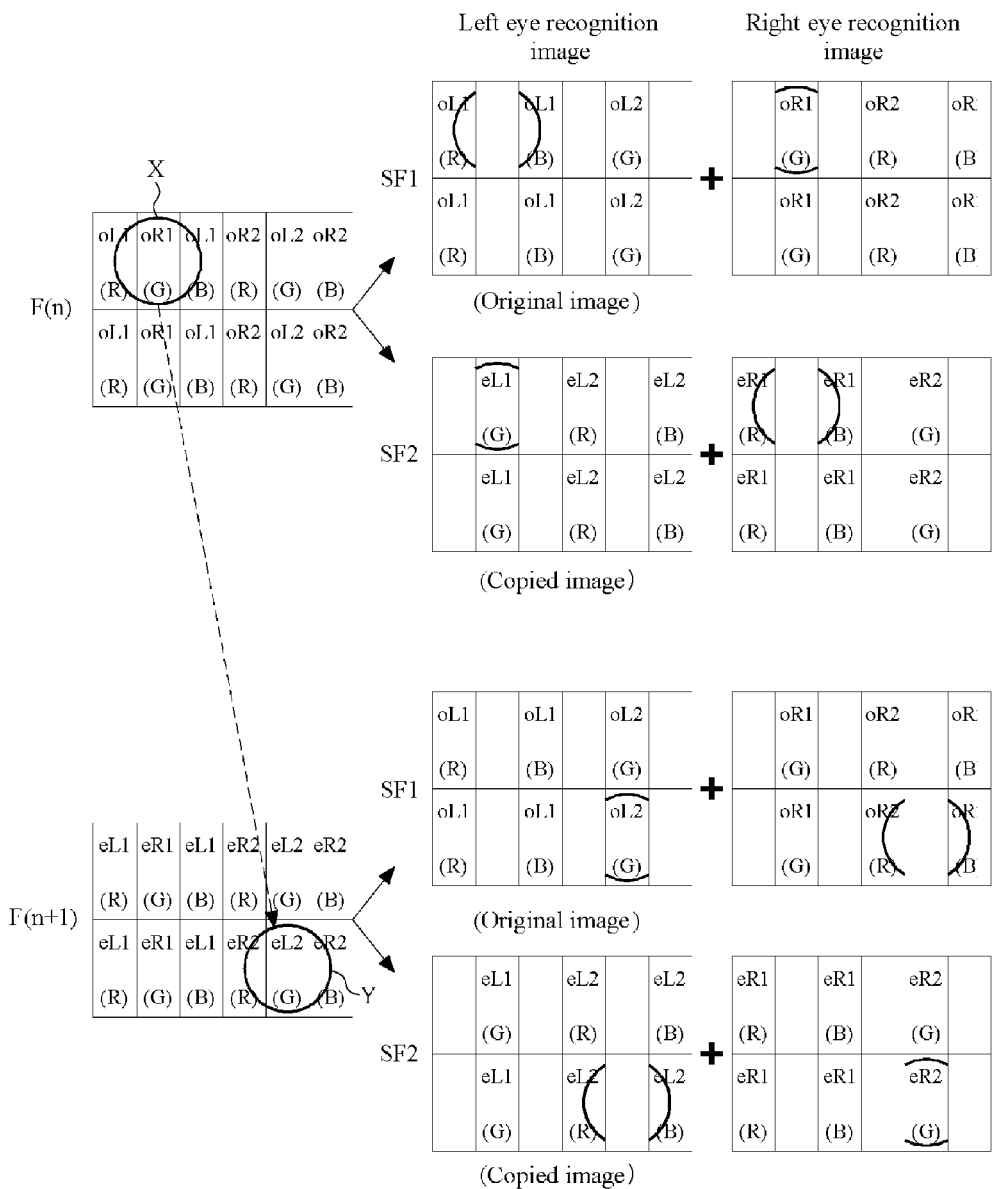
Figure 7:
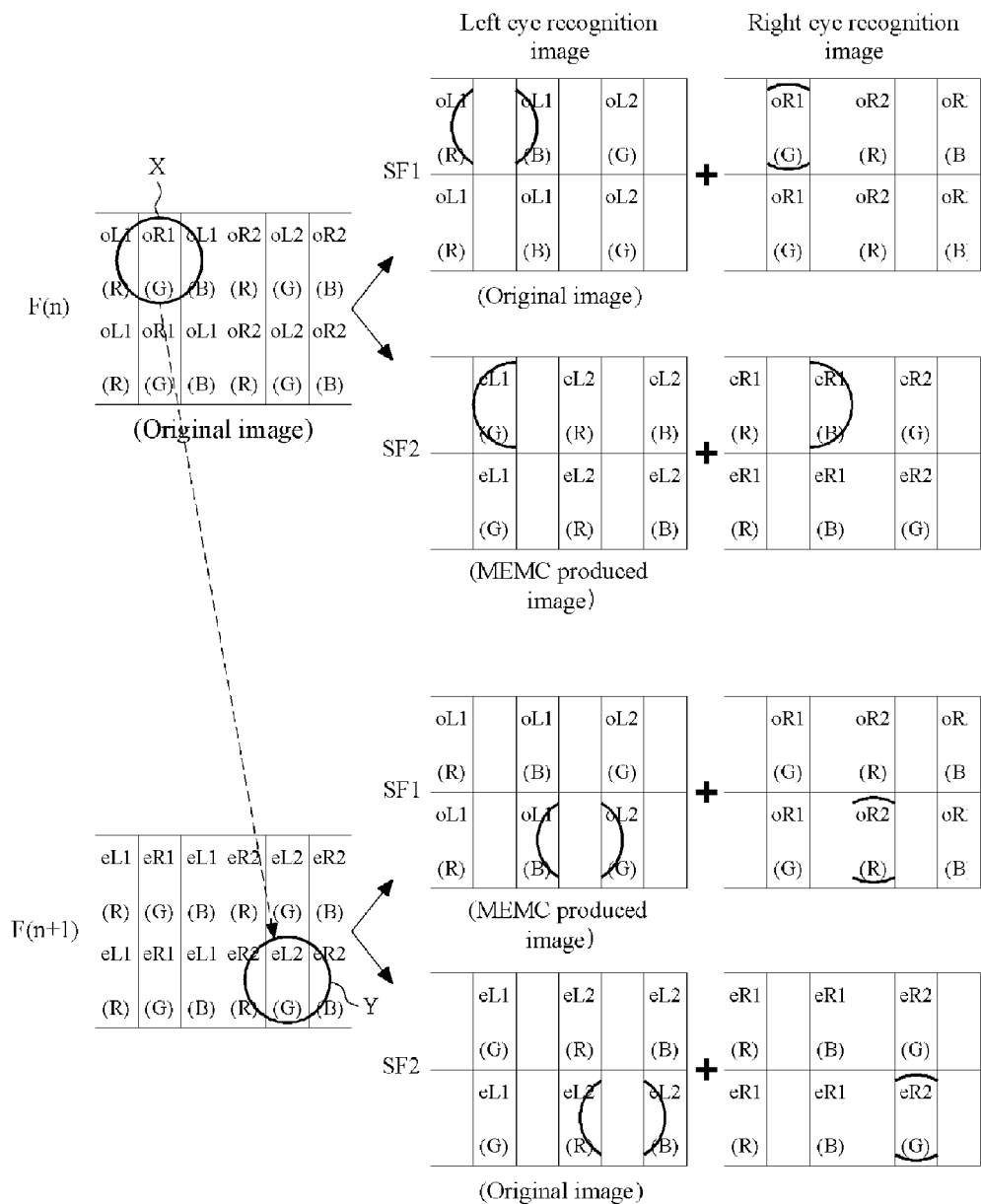

In FIGS. 5 to 7, 'oL1' and 'oL2' are left eye image data written to the pixels of the pixel array PIX during the first sub-frame period SF1, and 'oR1' and 'oR2' are right eye image data written to the pixels of the pixel array PIX during the first sub-frame period SF1. 'eL1 and eL2' are left eye image data written to the pixels of the pixel array PIX during the second sub-frame period SF2, and 'eR1 and eR2' are right eye image data written to the pixels of the display panel 100 during the second sub-frame period SF2.

FIG. 6 illustrates an example of applying a frame rate up-conversion (FRUC) method to produce a copied image of an original image as an example of the method for driving the autostereoscopic display shown in FIG. 5. In FIG. 6, the pixel array includes 6×2 pixels, for example. In FIG. 6, 'X' is a motion object of the original image received in a nth frame period F(n), where n is a positive integer, and 'Y' is a motion object of the original image received in a (n+1)th frame period F(n+1).

As shown in FIG. 6, the 3D data formatter 120 copies original image data received at a frame rate of 60 Hz and produces a copied image.

It is assumed that a frame rate of image data, which the host system 110 inputs to the 3D data formatter 120, is 60 Hz, for example. The timing controller 101 multiplies the frame rate by 2. Hence, the timing controller 101 supplies the original image data and copied image data to the data driving circuit 102 at the frame rate of 120 Hz and also controls the display panel drivers 102 and 103, the switchable 3D element 200, and the backlight unit 300 at the frame rate of 120 Hz.

In the driving method shown in FIG. 6, the nth frame period F(n) is time-divided into first and second sub-frame periods SF1 and SF2, and the frame rate increases to twice. In the same manner as the nth frame period F(n), the (n+1)th frame period F(n+1) is time-divided into first and second sub-frame periods SF1 and SF2, and the frame rate increases to twice. The display panel drivers 102 and 103 write the original image data including the motion object X to the pixel array PIX of the display panel 100 during the first sub-frame period SF1 of the nth frame period F(n), and then write the copied image data to the pixel array PIX of the display panel 100 during the second sub-frame period SF2 of the nth frame period F(n). The display panel drivers 102 and 103 write the original image data including the motion object Y to the pixel array PIX of the display panel 100 during the first sub-frame period SF1 of the (n+1)th frame period F(n+1), and then write the copied image data to the pixel array PIX of the display panel 100 during the second sub-frame period SF2 of the (n+1)th frame period F(n+1). In case of a 2-view system, the display panel drivers 102 and 103 shift the 3D image data, which is divided into the left eye image data and the right eye image data, to the right by one subpixel in each sub-frame period.

The 3D element driver 210 shifts the lens or the barrier of the switchable 3D element 200 in synchronization with a shift timing of the 3D image data in each sub-frame period. For example, in case of the 2-view system, the 3D element driver 210 shifts the lens or the barrier of the switchable 3D element 200 by one subpixel. The 3D element driver 210 controls the liquid crystal molecules using the voltage applied to the liquid crystal layer 18, thereby shifting a position of a light block portion and a position of a light transmission portion in the switchable barrier BAR or shifting the switchable lens LENTI.

As shown in FIGS. 9 to 13, the backlight driver 310 divides the light emitting area of the backlight unit 300 into the plurality of backlight blocks and makes the backlight blocks sequentially emit light along a data scanning direction of the pixel array PIX. The shift timing of the switchable 3D element 200 has to be agreed with a sequential driving timing of the backlight blocks divided based on the scanning backlight driving technology. For this, the switchable 3D element 200 is divided into the plurality of 3D blocks which have the same form and the same number as the backlight blocks divided from the light emitting area of the backlight unit 300. The 3D element driver 210 sequentially shifts the lens or the barrier of the switchable 3D element 200 by one 3D block along the shift direction of the backlight blocks. As a result, the backlight blocks are sequentially shifted along the data scanning direction of the pixel array and are sequentially turned on and off, and the lenses or the barriers of the 3D blocks are sequentially shifted along a shift direction of the backlight blocks.

FIG. 7 illustrates an example of the method for driving the autostereoscopic display shown in FIG. 5. More specifically, FIG. 7 illustrates an example of applying the frame rate up-conversion (FRUC) method which analyzes the original images, calculates the motion vector of the motion object, and produces the new images based on the motion vector. In FIG. 7, the pixel array includes 6×2 pixels, for example. In FIG. 7, 'X' is a motion object of the original image received in a nth frame period F(n), where n is a positive integer, and 'Y' is a motion object of the original image received in a (n+1)th frame period F(n+1).

As shown in FIG. 7, the 3D data formatter 120 analyzes original image data received at a frame rate of 60 Hz using the MEMC algorithm and inserts images (hereinafter, referred to as 'MEMC produced image') produced based on the motion vector between the original images.

It is assumed that a frame rate of image data, which the host system 110 inputs to the 3D data formatter 120, is 60 Hz, for example. The timing controller 101 multiplies the frame rate by 2. Hence, the timing controller 101 supplies the original image data and MEMC produced image data to the data driving circuit 102 at the frame rate of 120 Hz and also controls the display panel drivers 102 and 103, the switchable 3D element 200, and the backlight unit 300 at the frame rate of 120 Hz.

In the driving method shown in FIG. 7, the nth frame period F(n) is time-divided into first and second sub-frame periods SF1 and SF2, and the frame rate increases to twice. In the same manner as the nth frame period F(n), the (n+1)th frame period F(n+1) is time-divided into first and second sub-frame periods SF1 and SF2, and the frame rate increases to twice. The display panel drivers 102 and 103 write the original image data including the motion object X to the pixel array PIX of the display panel 100 during the first sub-frame period SF1 of the nth frame period F(n), and then write the MEMC produced image data to the pixel array PIX of the display panel 100 during the second sub-frame period SF2 of the nth frame period F(n). The display panel drivers 102 and 103 write the MEMC produced image data to the pixel array PIX of the display panel 100 during the first sub-frame period SF1 of the (n+1)th frame period F(n+1), and then write the original image data including the motion object Y to the pixel array PIX of the display panel 100 during the second sub-frame period SF2 of the (n+1)th frame period F(n+1). In case of the 2-view system, the display panel drivers 102 and 103 shift the 3D image data, which is divided into the left eye image data and the right eye image data, to the right by one subpixel in each sub-frame period.

The 3D element driver 210 shifts the lens or the barrier of the switchable 3D element 200 in synchronization with a shift timing of the 3D image data in each sub-frame period. The backlight driver 310 makes the backlight blocks sequentially emit light along the data scanning direction of the pixel array PIX. The 3D element driver 210 sequentially shifts the 3D blocks of the switchable 3D element 200 along the shift direction of the backlight blocks.

Figure 10:
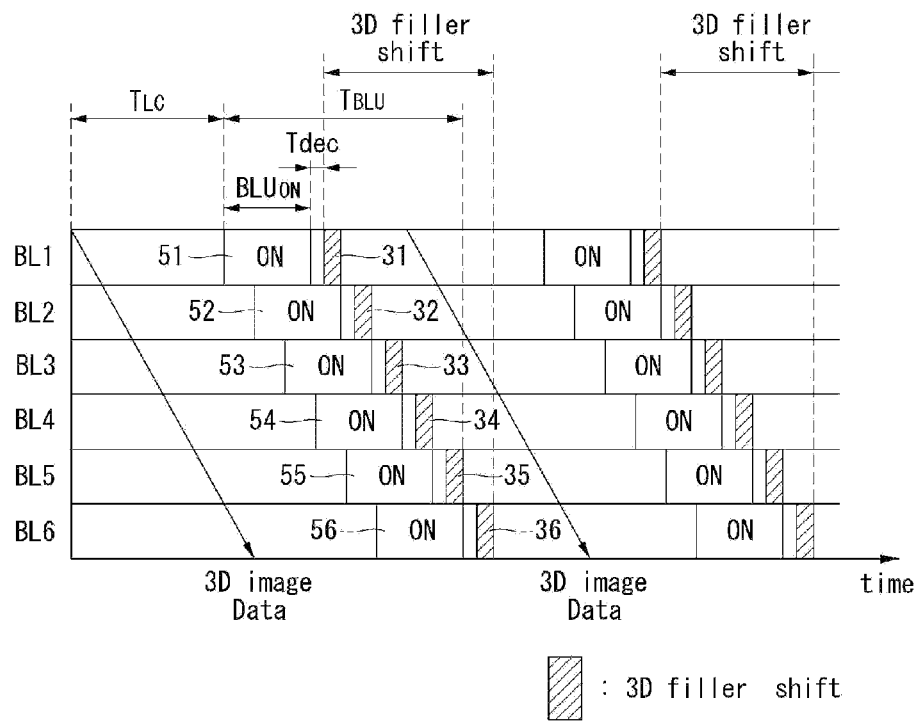
FIGS. 10 to 12 illustrate a shift method of a switchable 3D element when a light emitting area of a backlight unit is divided into six backlight blocks as shown in FIG. 9.
Figure 11:
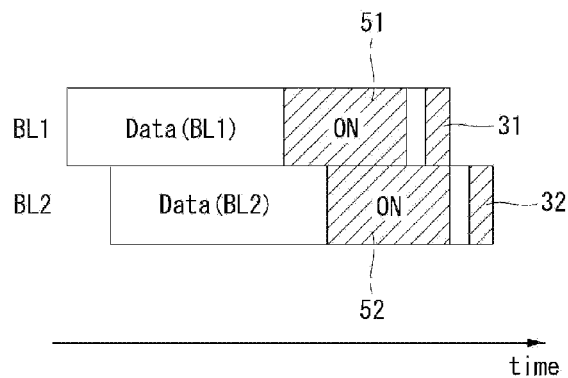
Figures 12, 13:
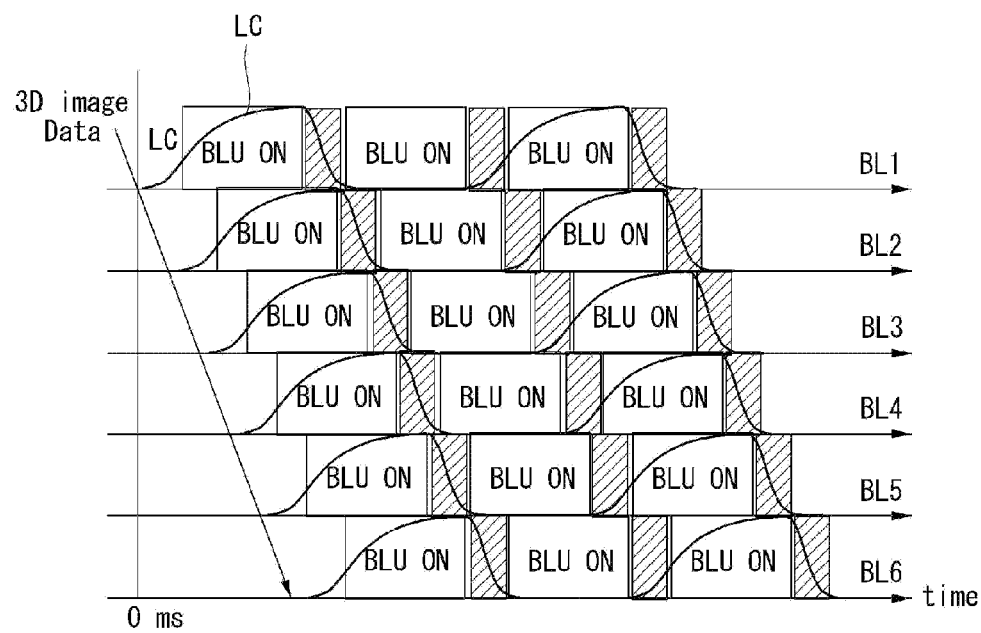
FIG. 13 illustrates an example of dividing a light emitting area of a backlight unit into three backlight blocks.

FIG. 9 illustrates an example of dividing the light emitting area of the backlight unit into six backlight blocks. FIGS. 10 to 12 illustrate a shift method of the switchable 3D element when the light emitting area of the backlight unit is divided into the six backlight blocks as shown in FIG. 9.

As shown in FIGS. 9 to 12, the light emitting area of the backlight unit 300 is divided into first to sixth backlight blocks BL1 to BL6, which are driven based on the scanning backlight driving technology and are sequentially turned on and off. The switchable 3D element 200 is divided into six 3D blocks corresponding to the backlight blocks BL1 to BL6. Thus, the 3D blocks have the same form and the same number as the backlight blocks BL1 to BL6.

The 3D image data is written to the pixel array PIX of the display panel 100 along the data scanning direction of the pixel array PIX. The backlight blocks BL1 to BL6 are turned on and off in each sub-frame period. The backlight blocks BL1 to BL6 are turned on and off after a liquid crystal response delay time $T_{LC}$ of the pixel array PIX, to which the 3D image data is written, passed. Turn-on and turn-off timings of the backlight blocks BL1 to BL6 are shifted by one block along the data scanning direction. The lens or the barrier of the switchable 3D element 200 is shifted in each sub-frame period and is shifted in the turn-off period of the backlight blocks BL1 to BL6. Also, the lens or the barrier of the switchable 3D element 200 is shifted before next data is written to the pixel array PIX in the turn-off period of the backlight blocks BL1 to BL6. Thus, the shift timing of the lens or the barrier of the 3D blocks is shifted along the data scanning direction of the pixel array PIX in the same manner as the backlight blocks BL1 to BL6 shown in FIGS. 10 to 12.

It is assumed that a block of the pixel array PIX and the 3D block, which are opposite to the first backlight block BL1, are respectively referred to as a first pixel block and a first 3D block, and a block of the pixel array PIX and the 3D block, which are opposite to the second backlight block BL2, are respectively referred to as a second pixel block and a second 3D block. A scanning backlight driving method and a shift control method of the switchable 3D element 200 according to the embodiment of the invention are described below.

The 3D image data is sequentially written to pixels of the first pixel block, and then the first backlight block BL1 is turned on after a predetermined liquid crystal response delay time $T_{LC}$ passed. Subsequently, when the first backlight block BL1 is turned on during a turn-on period defined by a predetermined duty ratio and then is turned off, a barrier or a lens of the first 3D block is shifted in a first shift period. The first shift period is set to a time determined before next data is written to the first pixel block in a turn-off period of the first backlight block BL1. More specifically, the first shift period may be set to a time determined after a predetermined light source turn-off delay time Tdec passed from a turn-off start time point of the first backlight block BL1. The light source turn-off delay time Tdec is a delay time until the LED, which is in a turned-on state due to remaining charges of the LED, is practically turned off even after the supply of the driving voltage to the light source such as the LED is blocked.

After the 3D image data is written to the first pixel block, the 3D image data starts to be written to pixels of the second pixel block. The 3D image data is sequentially written to the pixels of the second pixel block, and then the second backlight block BL2 is turned on after the predetermined liquid crystal response delay time $T_{LC}$ passed. Subsequently, when the second backlight block BL2 is turned on during a turn-on period defined by a predetermined duty ratio and then is turned off, a barrier or a lens of the second 3D block is shifted in a second shift period. The second shift period is set to a time determined before next data is written to the second pixel block in a turn-off period of the second backlight block BL2. More specifically, the second shift period may be set to a time determined after the predetermined light source turn-off delay time Tdec passed from a turn-off start time point of the second backlight block BL2.

As shown in FIGS. 10 to 12, turn-on periods of the adjacent backlight blocks may overlap one another. Namely, a shift period of a nth 3D block may overlap a turn-on period of a (n+1)th backlight block. For example, as shown in FIG. 11, a shift period of the first 3D block may overlap a turn-on period of the second backlight block BL2.

In all of the backlight blocks BL1 to BL6 of the backlight unit 300, time differences between the turn-on periods of the backlight blocks BL1 to BL6 and the shift periods of the respective 3D blocks are substantially uniform.

In FIGS. 10 and 11, an arrow of a diagonal direction is the scanning direction of the 3D image data, and "ON" is the turn-on period of each of the first to sixth backlight blocks BL1 to BL6. Further, in FIGS. 10 and 11, reference numbers 51 to 56 denote turn-on periods of the first to sixth backlight blocks BL1 to BL6, and reference numbers 31 to 36 denote shift periods of the first to sixth 3D blocks BL1 to BL6. In FIG. 12, "LC" denotes liquid crystal response characteristics.

Figure 14:
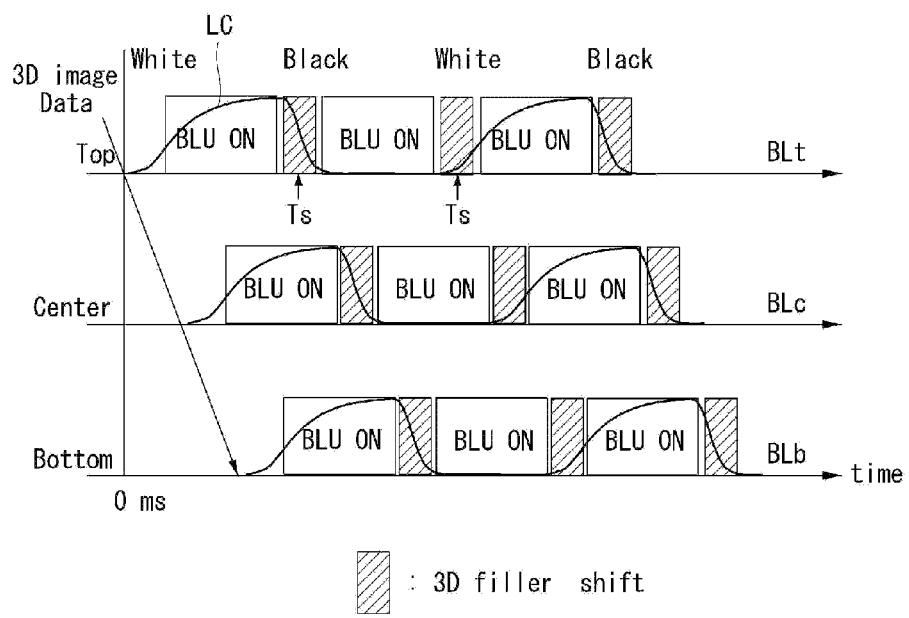
FIG. 14 illustrates a shift method of a switchable 3D element when a light emitting area of a backlight unit is divided into three backlight blocks as shown in FIG. 13.

FIG. 13 illustrates an example of dividing the light emitting area of the backlight unit into three backlight blocks. FIG. 14 illustrates a shift method of the switchable 3D element when the light emitting area of the backlight unit is divided into the three backlight blocks as shown in FIG. 13.

As shown in FIGS. 13 and 14, the light emitting area of the backlight unit 300 is divided into first to third backlight blocks BLt, BLc, and BLb, which are driven based on the scanning backlight driving technology and are sequentially turned on and off. The switchable 3D element 200 is divided into three 3D blocks corresponding to the backlight blocks BLt, BLc, and BLb.

The 3D image data is written to the pixel array PIX of the display panel 100 along the data scanning direction of the pixel array PIX. The backlight blocks BLt, BLc, and BLb are turned on and off in each sub-frame period. In this instance, the backlight blocks BLt, BLc, and BLb are turned on and off after a liquid crystal response delay time $T_{LC}$ of the pixel array PIX, to which the 3D image data is written, passed. Turn-on and turn-off timings of the backlight blocks BLt, BLc, and BLb are shifted by one block along the data scanning direction. The switchable 3D element 200 is sequentially shifted in agreement with timings, at which the backlight blocks BLt, BLc, and BLb are sequentially turned off, in each sub-frame period. A shift period of the 3D blocks is determined in agreement with a turn-off timing of the backlight blocks BLt, BLc, and BLb. The shift period of the 3D blocks is set to a time determined after the backlight blocks BLt, BLc, and BLb are turned off and before next data is written to the pixel array PIX. Thus, the shift timing of the 3D blocks is shifted along the data scanning direction of the pixel array PIX in the same manner as the backlight blocks BLt, BLc, and BLb shown in FIG. 14.

It is assumed that a block of the pixel array PIX and the 3D block, which are opposite to the first backlight block BLt, are respectively referred to as a first pixel block and a first 3D block, and a block of the pixel array PIX and the 3D block, which are opposite to the second backlight block BLc, are respectively referred to as a second pixel block and a second 3D block. A scanning backlight driving method and a shift control method of the switchable 3D element 200 according to the embodiment of the invention are described below.

The 3D image data is sequentially written to pixels of the first pixel block, and then the first backlight block BLt is turned on after a predetermined liquid crystal response delay time $T_{LC}$ passed. Subsequently, when the first backlight block BLt is turned on during a turn-on period and then is turned off, the first 3D block is shifted. The first 3D block may be shifted after a predetermined light source turn-off delay time Tdec passed from the turn-off of the first backlight block BLt.

The 3D image data is sequentially written to pixels of the second pixel block, and then the second backlight block BLc is turned on after the predetermined liquid crystal response delay time $T_{LC}$ passed. Subsequently, when the second backlight block BLc is turned on during a turn-on period and then is turned off, the second 3D block is shifted. The second 3D block may be shifted after the predetermined light source turn-off delay time Tdec passed from the turn-off of the second backlight block BLc.

As shown in FIG. 14, turn-on periods of the adjacent backlight blocks may overlap one another. Namely, a shift period of a nth 3D block may overlap a turn-on period of a (n+1)th backlight block. In all of the backlight blocks BLt, BLc, and BLb of the backlight unit 300, time differences between the turn-on periods of the backlight blocks BLt, BLc, and BLb and the shift periods of the respective 3D blocks are substantially uniform.

In FIG. 14, an arrow of a diagonal direction is the scanning direction of the 3D image data, and "BLU ON" is the turn-on period of each of the backlight blocks BLt, BLc, and BLb. Further, a reference number "Ts" is the shift period of each of the 3D blocks.

Figure 15:
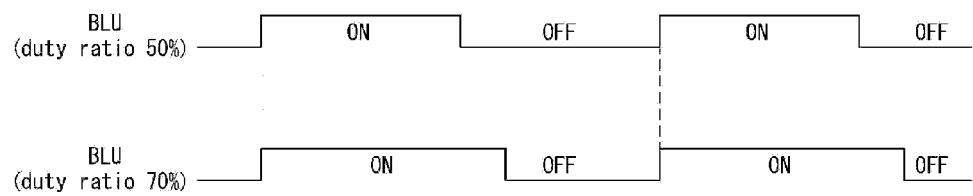
FIG. 15 illustrates a duty ratio of a backlight unit.

FIG. 15 illustrates a duty ratio of the backlight unit. FIG. 16 illustrates a motion picture response time (MPRT) (unit: ms) and a luminance (unit: nit) of a 3D image based on the duty ratio of the backlight unit.

As shown in FIG. 15, the light sources of the backlight unit 300 are turned on in a turn-on period defined by a predetermined duty ratio and are turned off in a turn-off period. As the duty ratio increases, a length of a turn-on period 'ON' per unit time increases. Therefore, the backlight luminance increases. The backlight luminance is controlled by a duty ratio of a pulse width modulation (PWM) signal received from the timing controller 101 or the host system 110.

As can be seen from an experimental result of FIG. 16, when the backlight duty ratio changes, MPRT of the liquid crystal display a viewer perceives and a luminance of a 3D image change. Thus, when the backlight duty ratio is about 70% to 75% in consideration of the MPRT and the luminance of the 3D image, the display quality of the 3D image may be optimized. When the MPRT increases, motion blur or motion tailing may be improved. Also, the 3D crosstalk may be reduced.

A local dimming control method divides image data of one frame into a plurality of backlight blocks, calculates a representative value of each backlight block to select a dimming value, and adjusts a backlight duty ratio based on the selected dimming value. Thus, the backlight duty ratio of each backlight block may vary depending on the local dimming control method. It is preferable, but not required, that the backlight duty ratio for controlling the local dimming of each of the backlight blocks varies between about 70% and 75% in consideration of the quality of the 3D image. Other backlight duty ratios may be used.

Figure 17:
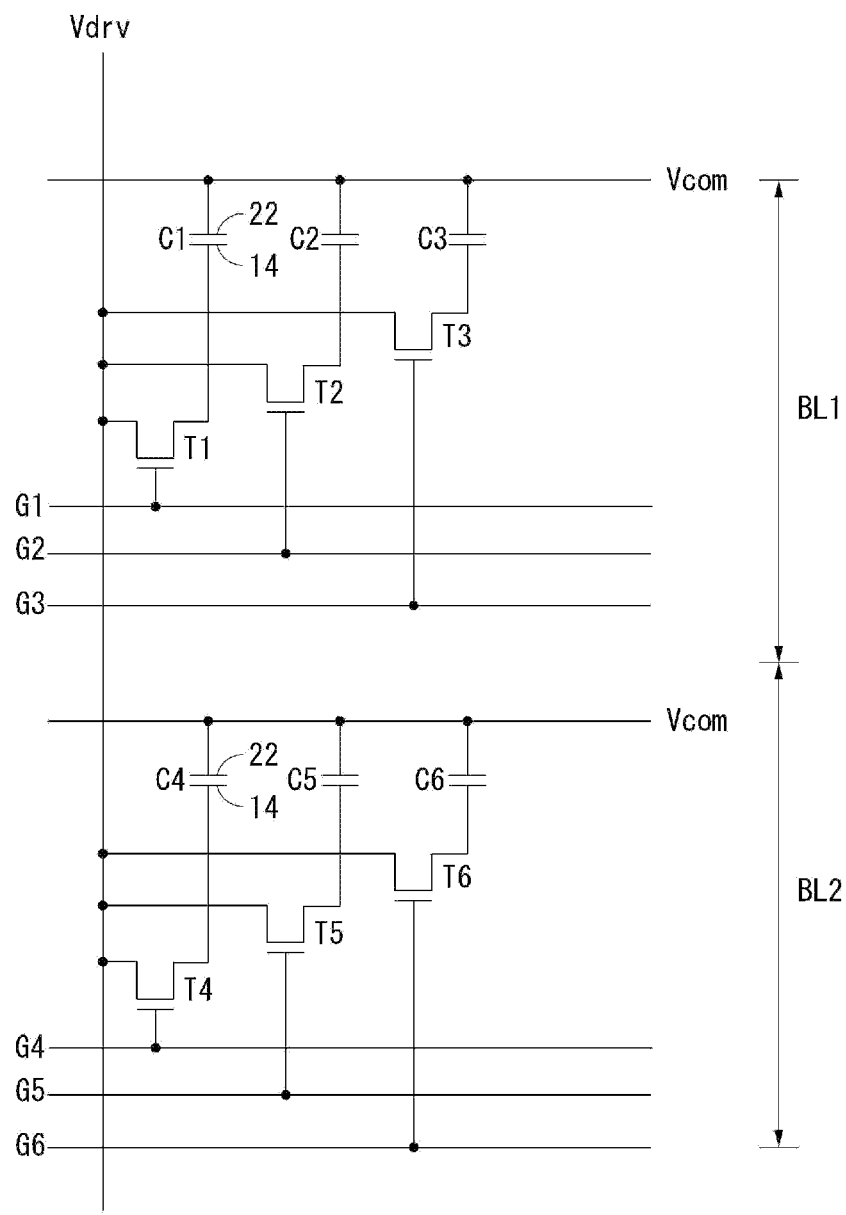
FIG. 17 is a circuit diagram illustrating configuration of a switchable 3D element for implementing a block division driving method of the switchable 3D element.
Figure 18:
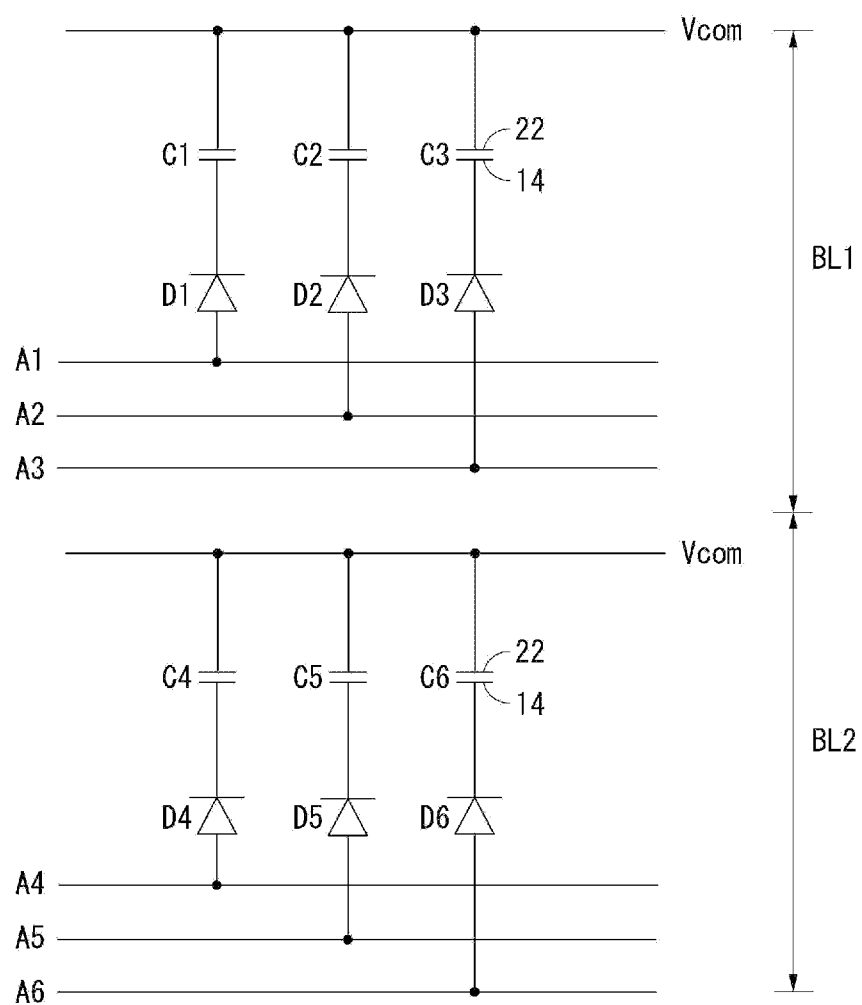
FIG. 18 is a circuit diagram illustrating another configuration of a switchable 3D element for implementing a block division driving method of the switchable 3D element.

The embodiment of the invention shifts the barrier or the lens formed in the switchable 3D element 200 on a per backlight block basis using active switch elements, which are electrically controllable, as shown in FIGS. 17 and 18. The active switch elements may be implemented as a transistor, a diode, etc. as shown in FIGS. 17 and 18.

FIG. 17 is a circuit diagram illustrating configuration of the switchable 3D element 200. FIG. 18 is a circuit diagram illustrating another configuration of the switchable 3D element 200.

As shown in FIG. 17, each of cells C1 to C6 includes a divided lower electrode 14, an upper electrode 22 to which a common voltage Vcom is applied, and a liquid crystal layer 18 formed between the lower electrode 14 and the upper electrode 22. Liquid crystal molecules of the cells C1 to C6 are driven by an electric field generated by a difference between a driving voltage Vdrv applied to the divided lower electrodes 14 and the common voltage Vcom applied to the upper electrodes 22, thereby forming a barrier surface or a lens surface.

Transistors T1 to T6 are turned on in response to a gate pulse applied trough gate lines G1 to G6 formed on the lower substrate 10 of the switchable 3D element 200 and supply the driving voltage Vdrv to the lower electrodes 14 of the cells C1 to C6. A magnitude of the driving voltage Vdrv is properly selected depending on driving methods of the switchable barrier BAR and the switchable lens LENTI.

It is assumed that three cells and three thin film transistors (TFTs) belong to a first 3D block corresponding to a first backlight block BL1 (or BLt), and three cells and three TFTs belong to a second 3D block corresponding to a second backlight block BL2 (or BLc). A block division driving method of the switchable 3D element 200 is described below.

The first 3D block includes the first to third cells C1 to C3 and the first to third TFTs T1 to T3 connected to the first to third cells C1 to C3.

The first to third cells C1 to C3 shift the barrier or the lens of the switchable 3D element 200 during a first shift period, which is set to a time determined after a turn-off start time point of the first backlight block BL1 (or BLt) and before next data is written to the first pixel block. The 3D element driver 210 supplies the driving voltage Vdrv to a driving voltage supply line. Further, the 3D element driver 210 sequentially supplies the gate pulses to the first to third gate lines G1 to G3 during the first shift period, so that the barrier or the lens produced by the first to third cells C1 to C3 is shifted in the first shift period. The first to third TFTs T1 to T3 shift the driving voltage Vdrv applied to the first to third cells C1 to C3 in response to the gate pulses from the first to third gate lines G1 to G3.

The first TFT T1 supplies the driving voltage Vdrv to the first cell C1 in response to the gate pulse from the first gate line G1. A gate electrode of the first TFT T1 is connected to the first gate line G1. A drain electrode of the first TFT T1 is connected to the driving voltage supply line, to which the driving voltage Vdrv is supplied, and a source electrode of the first TFT T1 is connected to the lower electrode 14 of the first cell C1.

The second TFT T2 supplies the driving voltage Vdrv to the second cell C2 in response to the gate pulse from the second gate line G2. A gate electrode of the second TFT T2 is connected to the second gate line G2. A drain electrode of the second TFT T2 is connected to the driving voltage supply line, and a source electrode of the second TFT T2 is connected to the lower electrode 14 of the second cell C2.

The third TFT T3 supplies the driving voltage Vdrv to the third cell C3 in response to the gate pulse from the third gate line G3. A gate electrode of the third TFT T3 is connected to the third gate line G3. A drain electrode of the third TFT T3 is connected to the driving voltage supply line, and a source electrode of the third TFT T3 is connected to the lower electrode 14 of the third cell C3.

After the first 3D block is shifted, the second 3D block is shifted in synchronization with a turn-off period of the second backlight block BL2 (or BLc). The second 3D block includes the fourth to sixth cells C4 to C6 and the fourth to sixth TFTs T4 to T6 connected to the fourth to sixth cells C4 to C6.

The fourth to sixth cells C4 to C6 shift the barrier or the lens of the switchable 3D element 200 during a second shift period, which is set to a time determined after a turn-off start time point of the second backlight block BL2 and before next data is written to the second pixel block. The 3D element driver 210 sequentially supplies the gate pulses to the fourth to sixth gate lines G4 to G6 during the second shift period, so that the barrier or the lens produced by the fourth to sixth cells C4 to C6 is shifted in the second shift period. The fourth to sixth TFTs T4 to T6 shift the driving voltage Vdrv applied to the fourth to sixth cells C4 to C6 in response to the gate pulses from the fourth to sixth gate lines G4 to G6.

The fourth TFT T4 supplies the driving voltage Vdrv to the fourth cell C4 in response to the gate pulse from the fourth gate line G4. A gate electrode of the fourth TFT T4 is connected to the fourth gate line G4. A drain electrode of the fourth TFT T4 is connected to the driving voltage supply line, and a source electrode of the fourth TFT T4 is connected to the lower electrode 14 of the fourth cell C4.

The fifth TFT T5 supplies the driving voltage Vdrv to the fifth cell C5 in response to the gate pulse from the fifth gate line G5. A gate electrode of the fifth TFT T5 is connected to the fifth gate line G5. A drain electrode of the fifth TFT T5 is connected to the driving voltage supply line, and a source electrode of the fifth TFT T5 is connected to the lower electrode 14 of the fifth cell C5.

The sixth TFT T6 supplies the driving voltage Vdrv to the sixth cell C6 in response to the gate pulse from the sixth gate line G6. A gate electrode of the sixth TFT T6 is connected to the sixth gate line G6. A drain electrode of the sixth TFT T6 is connected to the driving voltage supply line, and a source electrode of the sixth TFT T6 is connected to the lower electrode 14 of the sixth cell C6.

As shown in FIG. 18, each of cells C1 to C6 includes a divided lower electrode 14, an upper electrode 22 to which the common voltage Vcom is applied, and a liquid crystal layer 18 formed between the lower electrode 14 and the upper electrode 22. Liquid crystal molecules of the cells C1 to C6 are driven by an electric field generated by a difference between the driving voltage Vdrv applied to the divided lower electrodes 14 and the common voltage Vcom applied to the upper electrodes 22, thereby forming a barrier surface or a lens surface.

Diodes D1 to D6 are turned on due to the driving voltage Vdrv applied trough anode lines A1 to A6 formed on the lower substrate 10 of the switchable 3D element 200 and supply the driving voltage Vdrv to the lower electrodes 14 of the cells C1 to C6. A magnitude of the driving voltage Vdrv is properly selected depending on driving methods of the switchable barrier BAR and the switchable lens LENTI.

It is assumed that three cells and three diodes belong to a first 3D block corresponding to a first backlight block BL1 (or BLt), and three cells and three diodes belong to a second 3D block corresponding to a second backlight block BL2 (or BLc). A block division driving method of the switchable 3D element 200 is described below.

The first 3D block includes the first to third cells C1 to C3 and the first to third diodes D1 to D3 connected to the first to third cells C1 to C3.

The first to third cells C1 to C3 shift the barrier or the lens of the switchable 3D element 200 during a first shift period, which is set to a time determined after a turn-off start time point of the first backlight block BL1 (or BLt) and before next data is written to the first pixel block. The 3D element driver 210 sequentially supplies the driving voltage Vdrv to the first to third anode lines A1 to A3 during the first shift period, so that the barrier or the lens produced by the first to third cells C1 to C3 is shifted in the first shift period. The first to third diodes D1 to D3 are sequentially turned on in response to the driving voltage Vdrv from the first to third anode lines A1 to A3 and supply the driving voltage Vdrv to the first to third cells C1 to C3.

The first diode D1 supplies the driving voltage Vdrv to the first cell C1 in response to the driving voltage Vdrv from the first anode line A1. An anode of the first diode D1 is connected to the first anode line A1, and a cathode of the first diode D1 is connected to the lower electrode 14 of the first cell C1.

The second diode D2 supplies the driving voltage Vdrv to the second cell C2 in response to the driving voltage Vdrv from the second anode line A2. An anode of the second diode D2 is connected to the second anode line A2, and a cathode of the second diode D2 is connected to the lower electrode 14 of the second cell C2.

The third diode D3 supplies the driving voltage Vdrv to the third cell C3 in response to the driving voltage Vdrv from the third anode line A3. An anode of the third diode D3 is connected to the third anode line A3, and a cathode of the third diode D3 is connected to the lower electrode 14 of the third cell C3.

After the first 3D block is shifted, the second 3D block is shifted in synchronization with a turn-off period of the second backlight block BL2 (or BLc). The second 3D block includes the fourth to sixth cells C4 to C6 and the fourth to sixth diodes D4 to D6 connected to the fourth to sixth cells C4 to C6.

The fourth to sixth cells C4 to C6 shift the barrier or the lens of the switchable 3D element 200 during a second shift period, which is set to a time determined after a turn-off start time point of the second backlight block BL2 (or BLc) and before next data is written to the second pixel block. The 3D element driver 210 sequentially supplies the driving voltage Vdrv to the fourth to sixth anode lines A4 to A6 during the second shift period, so that the barrier or the lens produced by the fourth to sixth cells C4 to C6 is shifted in the second shift period. The fourth to sixth diodes D4 to D6 are sequentially turned on in response to the driving voltage Vdrv from the fourth to sixth anode lines A4 to A6 and supply the driving voltage Vdrv to the fourth to sixth cells C4 to C6.

The fourth diode D4 supplies the driving voltage Vdrv to the fourth cell C4 in response to the driving voltage Vdrv from the fourth anode line A4. An anode of the fourth diode D4 is connected to the fourth anode line A4, and a cathode of the fourth diode D4 is connected to the lower electrode 14 of the fourth cell C4.

The fifth diode D5 supplies the driving voltage Vdrv to the fifth cell C5 in response to the driving voltage Vdrv from the fifth anode line A5. An anode of the fifth diode D5 is connected to the fifth anode line A5, and a cathode of the fifth diode D5 is connected to the lower electrode 14 of the fifth cell C5.

The sixth diode D6 supplies the driving voltage Vdrv to the sixth cell C6 in response to the driving voltage Vdrv from the sixth anode line A6. An anode of the sixth diode D6 is connected to the sixth anode line A6, and a cathode of the sixth diode D6 is connected to the lower electrode 14 of the sixth cell C6.

The autostereoscopic display according to the embodiment of the invention is configured, so that the turn-off periods of the backlight blocks and the liquid crystal response delay time of the display panel and the switchable 3D element are optimized as described below.

As shown in FIG. 13, when the light emitting area of the backlight unit 300 is divided into the first to third backlight blocks BLt, BLc, and BLb, the switchable 3D element 200 is divided into three 3D blocks respectively corresponding to the three backlight blocks BLt, BLc, and BLb. Namely, the 3D blocks of the switchable 3D element 200 have the same form and the same number as the backlight blocks BLt, BLc, and BLb.

The 3D image data, which is divided into the left eye image data 'L' and the right eye image data 'R', is written to the pixel array PIX of the display panel 100 along the data scanning direction travelling from the top to the bottom of the display panel 100.

Figure 19:
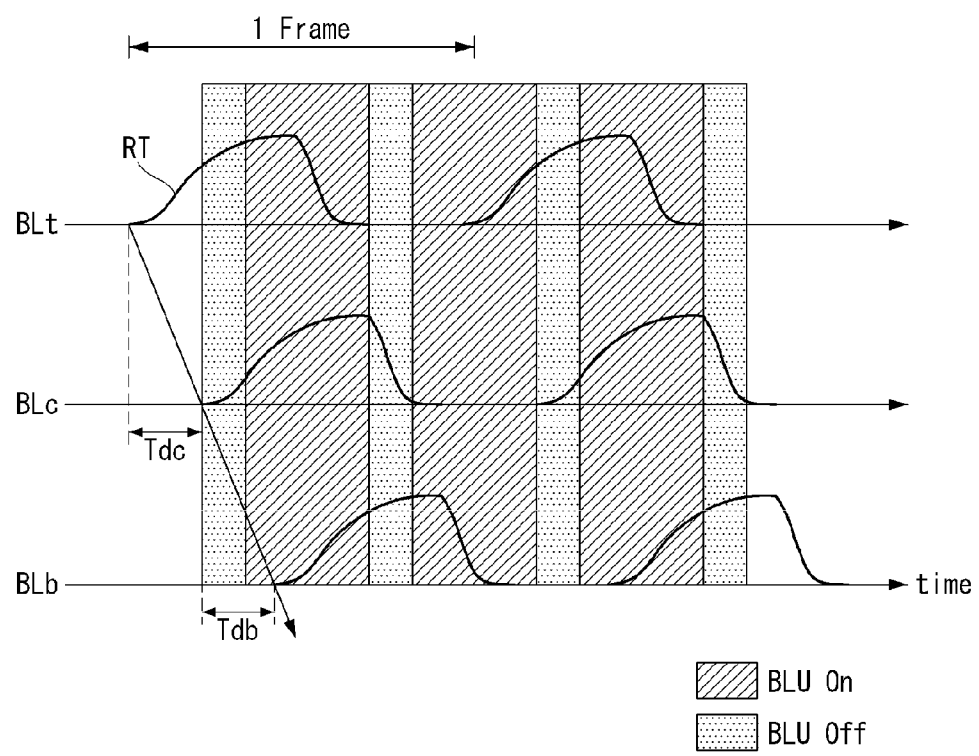
FIG. 19 illustrates a delay time between backlight blocks and a turn-on time and a turn-off time of a backlight unit in a scanning backlight driving technology applied when a light emitting area of the backlight unit is divided into three backlight blocks as shown in FIG. 13.
Figure 20:
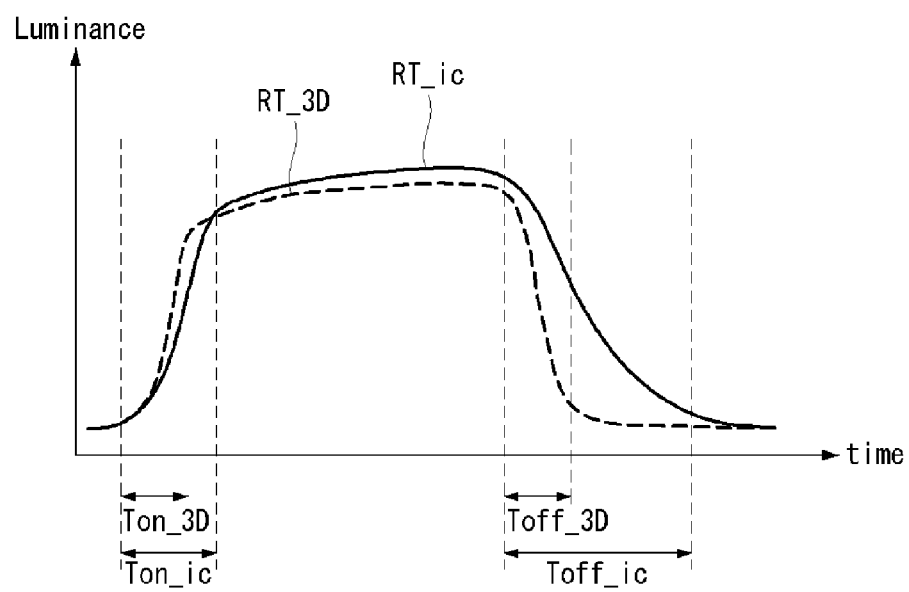
FIG. 20 is a waveform diagram showing a liquid crystal response time of a display panel and a liquid crystal response time of a switchable 3D element.

The backlight blocks BLt, BLc, and BLb are sequentially turned on and off along the scanning direction of the pixel data written to the display panel 100. The turn-on timings and the turn-off timings of the backlight blocks BLt, BLc, and BLb are sequentially shifted by one block along the scanning direction of the pixel data. As shown in FIGS. 19 and 20, the backlight blocks BLt, BLc, and BLb are turned off in a rising period and a falling period of a liquid crystal response characteristic curve of the display panel 100 and are turned on in a liquid crystal response saturation period between the rising period and the falling period.

As shown in FIGS. 19 and 20, the barrier or the lens of the switchable 3D element 200 has to be shifted in a turn-off period 'BLU off' of each of the backlight blocks BLt, BLc, and BLb, so as to reduce the MPRT and the 3D crosstalk on the entire screen of the display panel 100. The barrier or the lens formed on the nth 3D block is shifted in the turn-off period of the nth backlight block.

The 3D element driver 210 shifts the driving voltage of the switchable 3D element 200 in synchronization with the turn-off periods of the backlight blocks BLt, BLc, and BLb and sequentially shifts the barrier or the lens of the switchable 3D element 200 on a per 3D block basis. In FIG. 19, "BLU on" is the turn-on period of the backlight block, and "RT" is the liluid crystal response characteristic curve of the display panel 100 and the switchable 3D element 200. "BLU off" is the turn-off period of the backlight block. "Tdc" is a liluid crystal response start delay time of the second pixel block positioned in the middle of the display panel 100 based on the first pixel block positioned on the upper side of the display panel 100, and "Tdb" is a liluid crystal response start delay time of the third pixel block positioned on the lower side of the display panel 100 based on the second pixel block of the display panel 100. In FIG. 20, "Ton_3D" is the rising period of the liluid crystal response characteristic curve of the switchable 3D element 200, and "Toff_3D" is the falling period of the liluid crystal response characteristic curve of the switchable 3D element 200. Further, "Ton_ic" is the rising period of the liluid crystal response characteristic curve of the display panel 100, and "Toff_ic" is the falling period of the liluid crystal response characteristic curve of the display panel 100.

The liluid crystal response characteristic curve of the display panel 100 is not completely agreed with the liluid crystal response characteristic curve of the switchable 3D element 200. As shown in FIG. 20, the liluid crystal response characteristic curve of the display panel 100 is generally different from the liluid crystal response characteristic curve of the switchable 3D element 200 in the rising period and the falling period. Considering a difference between the liluid crystal response times of the display panel 100 and the switchable 3D element 200, a maximum liluid crystal response time of the switchable 3D element 200 has to be equal to or shorter than a maximum liluid crystal response time of the display panel 100 as indicated by the following conditional expression (1), so as to reduce the MPRT and the 3D crosstalk on the entire screen of the display panel 100.

The maximum liluid crystal response time of the switchable 3D element 200 selects a longer liluid crystal response time among liluid crystal response times of the rising period and the falling period of the liluid crystal response characteristic curve of the switchable 3D element 200. The maximum liluid crystal response time of the display panel 100 selects a longer liluid crystal response time among liluid crystal response times of the rising period and the falling period of the liluid crystal response characteristic curve of the display panel 100.

$$\text{Max}\{RT\_3D\_On, RT\_3D\_Off\} \le \text{Max}\{RT\_i\_On, RT\_i\_Off\} \quad (1)$$

In the above conditional expression (1), "RT_3D_On" is the liluid crystal response time of the rising period Ton_3D (refer to FIG. 20), in which the liluid crystal response starts, in the liluid crystal response characteristic curve of the switchable 3D element 200, and "RT_3D_Off" is the liluid crystal response time of the falling period Toff_3D (refer to FIG. 20) in the liluid crystal response characteristic curve of the switchable 3D element 200. Further, "RT_i_On" is the liluid crystal response time of the rising period Ton_ic (refer to FIG. 20), in which the liluid crystal response starts, in the liluid crystal response characteristic curve of the display panel 100, and "RT_i_Off" is the liluid crystal response time of the falling period Toff_ic (refer to FIG. 20) in the liluid crystal response characteristic curve of the display panel 100.

The liluid crystal response times of the display panel 100 and the switchable 3D element 200 may be adjusted based on viscoelastic characteristic of the liluid crystals, which varies depending on a composition of the liluid crystals, and the application voltage of the liluid crystals. Thus, if kinds and the application voltage of the liquid crystals are adjusted, the liluid crystal response times of the display panel 100 and the switchable 3D element 200 may be adjusted suitably for the above conditional expression (1).

In the scanning backlight driving technology according to the embodiment of the invention, the durations of the turn-off periods of the backlight blocks are expressed by the following conditional expressions (2) and (3). A manufacturer or a user of the 3D display may select one of the conditional expressions (2) and (3) in consideration of one of the MPRT and the luminance which is more important than the other when he or she decides. Alternatively, he or she may select both the conditional expressions (2) and (3) in consideration of both the MPRT and the luminance. The conditional expression (2) is effective when he/she decides that the MPRT is more important than the luminance. A maximum turn-off time of the backlight block is set to be substantially equal to the maximum liluid crystal response time [Max{RT_i_On, RT_i_Off}] of the display panel 100 through the conditional expression (2). The conditional expression (3) is effective when he/she decides that the luminance of the 3D image is more important than the MPRT. A minimum turn-off time of the backlight block is set to be substantially equal to the maximum liluid crystal response time [Max {RT_3D_On, RT_3D_Off}] of the switchable 3D element 200 through the conditional expression (3).

The durations of the turn-on period and the turn-off period of the backlight block may be adjusted based on a duty ratio of a pulse width modulation (PWM) signal applied to the backlight driver 310. The liquid crystal response times of the display panel 100 and the switchable 3D element 200 may be adjusted based on viscoelastic characteristic of the liluid crystals, which varies depending on the composition of the liluid crystals, and the application voltage of the liluid crystals. Thus, the embodiment of the invention may optimize the durations of the turn-on period and the turn-off period of the backlight unit 300 and the liluid crystal response times of the display panel 100 and the switchable 3D element 200, so as to satisfy the following conditional expressions (2) and (3).

$$\text{BLU Off Time} = \text{Max}\{RT\_i\_On, RT\_i\_Off\} \quad (2)$$

$$\text{BLU Off Time} = \text{Max}\{RT\_3D\_On, RT\_3D\_Off\} \quad (3)$$

The above conditional expressions (1) to (3) may be commonly applied to any mode irrespective of a normally white mode, a normally black mode, etc.

Operation start delay times between the 3D blocks are substantially equal to the liluid crystal response start delay times Tdc and Tdb (refer to FIG. 19) between the pixel blocks of the display panel 100. For example, an operation start delay time of the second 3D block opposite the second pixel block based on the first 3D block opposite the first pixel block is substantially equal to the liluid crystal response start delay time Tdc shown in FIG. 19. Further, an operation start delay time of the third 3D block opposite the third pixel block based on the second 3D block opposite the second pixel block is substantially equal to the liluid crystal response start delay time Tdb shown in FIG. 19.

As described above, the embodiment of the invention shifts the lens or the barrier of each of the 3D blocks on a per 3D block basis along in the shift direction of the backlight blocks, which are sequentially turned on and off based on the scanning backlight driving technology, thereby minimizing the MPRT and the 3D crosstalk of the autostereoscopic display and improving the quality of the 3D image.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An autostereoscopic display comprising:
    a display panel configured to display 3D image data;
    a backlight unit configured to provide light to the display panel;
    a backlight driver configured to sequentially drive light sources of the backlight unit along a scanning direction of the 3D image data written to the display panel;
    a switchable 3D element configured to form a barrier or a lens for separating optical axes of left eye image data and right eye image data from the 3D image data; and
    a 3D element driver configured to electrically control the switchable 3D element and shift the barrier or the lens formed in the switchable 3D element,
    wherein a light emitting area of the backlight unit is divided into a plurality of backlight blocks, and the backlight blocks are sequentially turned on and off along a data scanning direction of the display panel,
    wherein the switchable 3D element is divided into a plurality of 3D blocks respectively corresponding to the plurality of backlight blocks of the backlight unit, and a barrier or a lens of each of the 3D blocks is shifted on a per 3D block basis,
    wherein the barriers or the lenses of the 3D blocks are shifted in synchronization with turn-off timings of the backlight blocks,
    wherein a shift period of the barrier or the lens of each of the 3D blocks is set to a time determined after a turn-off start time point of each backlight block and before next data is written to a pixel block of the display panel corresponding to each backlight block, and
    wherein the pixel blocks of the display panel respectively correspond to the backlight blocks.

2. The autostereoscopic display of claim 1, wherein the 3D image data is sequentially written to a first pixel block of the display panel corresponding to a first backlight block, and then the first backlight block is turned on and off after a predetermined liquid crystal response delay time passed,
    wherein a barrier or a lens of a first 3D block corresponding to the first backlight block is shifted in a first shift period, which is set to a time determined before next data is written to the first pixel block in a turn-off period of the first backlight block,
    wherein the 3D image data is sequentially written to a second pixel block of the display panel corresponding to a second backlight block, and then the second backlight block is turned on and off after the liquid crystal response delay time passed,
    wherein a barrier or a lens of a second 3D block corresponding to the second backlight block is shifted in a second shift period, which is set to a time determined before next data is written to the second pixel block in a turn-off period of the second backlight block,
    wherein the second shift period is later than the first shift period.

3. The autostereoscopic display of claim 2, wherein the first shift period is set after a predetermined light source turn-off delay time passed from a turn-off start time point of the first backlight block,
    wherein the second shift period is set after a predetermined light source turn-off delay time passed from a turn-off start time point of the second backlight block.

4. The autostereoscopic display of claim 3, wherein a turn-on period of the first backlight block overlaps a turn-on period of the second backlight block,
    wherein the first shift period overlaps the turn-on period of the second backlight block.

5. The autostereoscopic display of claim 1, wherein the switchable 3D element includes active switch elements, which control a shift operation of the lenses or the barriers of the 3D blocks.

6. The autostereoscopic display of claim 5, wherein a first 3D block corresponding to a first backlight block includes first to third cells and first to third thin film transistors (TFTs), which are respectively connected to the first to third cells and respectively supply a driving voltage to the first to third cells, wherein a second 3D block corresponding to a second backlight block includes fourth to sixth cells and fourth to sixth TFTs, which are respectively connected to the fourth to sixth cells and respectively supply the driving voltage to the fourth to sixth cells, wherein the first TFT supplies the driving voltage to the first cell in response to a gate pulse from a first gate line, wherein the second TFT supplies the driving voltage to the second cell in response to a gate pulse from a second gate line, wherein the third TFT supplies the driving voltage to the third cell in response to a gate pulse from a third gate line, wherein the fourth TFT supplies the driving voltage to the fourth cell in response to a gate pulse from a fourth gate line, wherein the fifth TFT supplies the driving voltage to the fifth cell in response to a gate pulse from a fifth gate line, wherein the sixth TFT supplies the driving voltage to the sixth cell in response to a gate pulse from a sixth gate line.

7. The autostereoscopic display of claim 5, wherein a first 3D block corresponding to a first backlight block includes first to third cells and first to third diodes, which are respectively connected to the first to third cells and respectively supply a driving voltage to the first to third cells, wherein a second 3D block corresponding to a second backlight block includes fourth to sixth cells and fourth to sixth diodes, which are respectively connected to the fourth to sixth cells and respectively supply the driving voltage to the fourth to sixth cells, wherein the first diode supplies the driving voltage from a first anode line to the first cell, wherein the second diode supplies the driving voltage from a second anode line to the second cell, wherein the third diode supplies the driving voltage from a third anode line to the third cell, wherein the fourth diode supplies the driving voltage from a fourth anode line to the fourth cell, wherein the fifth diode supplies the driving voltage from a fifth anode line to the fifth cell, wherein the sixth diode supplies the driving voltage from a sixth anode line to the sixth cell.

8. The autostereoscopic display of claim 1, wherein a maximum liquid crystal response time of the switchable 3D element is equal to or shorter than a maximum liquid crystal response time of the display panel.

9. The autostereoscopic display of claim 8, wherein a maximum turn-off time of each of the backlight blocks is substantially equal to the maximum liquid crystal response time of the display panel.

10. The autostereoscopic display of claim 8, wherein a minimum turn-off time of each of the backlight blocks is substantially equal to the maximum liquid crystal response time of the switchable 3D element.

11. The autostereoscopic display of claim 1, wherein the backlight driver is configured to adjust a backlight duty ratio of each backlight block between 70% and 75% based on a dimming value of a corresponding backlight block.

12. A control method of an autostereoscopic display including a display panel displaying 3D image data, a backlight unit providing light to the display panel, and a switchable 3D element forming a barrier or a lens for separating optical axes of left eye image data and right eye image data from the 3D image data, the control method comprising:

sequentially driving light sources of the backlight unit along a scanning direction of the 3D image data written to the display panel; and electrically controlling the switchable 3D element to form the barrier or the lens in the switchable 3D element and shifting the barrier or the lens of the switchable 3D element, wherein a light emitting area of the backlight unit is divided into a plurality of backlight blocks, and the backlight blocks are sequentially turned on and off along a data scanning direction of the display panel, wherein the switchable 3D element is divided into a plurality of 3D blocks respectively corresponding to the plurality of backlight blocks of the backlight unit, and a barrier or a lens of each of the 3D blocks is shifted on a per 3D block basis, wherein the barriers or the lenses of the 3D blocks are shifted in synchronization with turn-off timings of the backlight blocks, wherein a shift period of the barrier or the lens of each of the 3D blocks is set to a time determined after a turn-off start time point of each backlight block and before next data is written to a pixel block of the display panel corresponding to each backlight block, and wherein the pixel blocks of the display panel respectively correspond to the backlight blocks.

13. The control method of claim 12, wherein the 3D image data is sequentially written to a first pixel block of the display panel corresponding to a first backlight block, and then the first backlight block is turned on and off after a predetermined liquid crystal response delay time passed, wherein a barrier or a lens of a first 3D block corresponding to the first backlight block is shifted in a first shift period, which is set to a time determined before next data is written to the first pixel block in a turn-off period of the first backlight block, wherein the 3D image data is sequentially written to a second pixel block of the display panel corresponding to a second backlight block, and then the second backlight block is turned on and off after the liquid crystal response delay time passed, wherein a barrier or a lens of a second 3D block corresponding to the second backlight block is shifted in a second shift period, which is set to a time determined before next data is written to the second pixel block in a turn-off period of the second backlight block, wherein the second shift period is later than the first shift period.

14. The control method of claim 13, wherein the first shift period is set after a predetermined light source turn-off delay time passed from a turn-off start time point of the first backlight block, wherein the second shift period is set after a predetermined light source turn-off delay time passed from a turn-off start time point of the second backlight block.

15. The control method of claim 14, wherein a turn-on period of the first backlight block overlaps a turn-on period of the second backlight block, wherein the first shift period overlaps the turn-on period of the second backlight block.

16. The control method of claim 12, wherein the switchable 3D element includes active switch elements, which control a shift operation of the lenses or the barriers of the 3D blocks.

17. The control method of claim 12, wherein a maximum liquid crystal response time of the switchable 3D element is equal to or shorter than a maximum liquid crystal response time of the display panel.

18. The control method of claim 12, wherein a backlight duty ratio of each backlight block is adjusted between 70% and 75% based on a dimming value of a corresponding backlight block.

* * * * *